Patented June 9, 1931

1,809,245

UNITED STATES PATENT OFFICE

ARTHUR D. LITTLE, OF BROOKLINE, MASSACHUSETTS, ASSIGNOR TO ARTHUR D. LITTLE, INCORPORATED, OF CAMBRIDGE, MASSACHUSETTS, A CORPORATION OF MASSACHUSETTS

BRIQUETTING FUEL MATERIAL

No Drawing. Application filed June 14, 1928. Serial No. 285,502.

My invention relates to the briquetting of comminuted fuel materials, of which coal fines furnish a conspicuous instance, and presents the aspects of process and the product thereof. The principal objects of this invention are: the use of a binding adhesive material for the fines which is soluble or extensible in water and requires only evaporation of water into which it is mixed, to become effective, so that elimination of the liquid vehicle may not involve either waste, or the cost of recovery, of more costly liquid, or any chemical or thermal treatment; which, in its final state in the briquette shall be practically weatherproof and waterproof, so that the briquettes may be stored in the open without danger of disintegration; and which, when the briquette is burned as fuel will itself burn without smoke or appreciable ash; and which shall be of low cost to produce in the first instance.

I have discovered that a water-miscible colloidal cellulose, which on elimination of its water-vehicle to a critical content becomes irreversible, constitutes a binder for fuel-fines which produces a briquette having all the objective desiderata above mentioned.

Colloidal cellulose is recognized in the art as being a form of that type product designated by the term cellulose hydrate which term includes the various types of gelatinized or "swollen" cellulose all of which exhibit similar physical properties and have the same empirical composition as cellulose. It is well-known to those skilled in the art that cellulose hydrate may be formed either by the action of concentrated acids, alkalies, or salts on cellulose, or by a severe mechanical treatment of cellulose in the presence of water, sometimes referred to as "dead beating", both methods resulting in the destruction of the cellulose fiber and the production, in water dispersion, of a gelatinized mass which on the elimination of the water to a critical content becomes irreversible or non-dispersable.

The readiest and most economical mode known to me of producing such a colloidal cellulose is to take fibrous cellulose in the form of wood pulp, bagasse, old papers, etc., and subject it to the action of a rod mill with an excess of water, say eight or nine times the dry weight of the cellulosic raw material, continuing the milling action until the cellulose is converted into a thick magma of salve-like consistency in which the fibrous structure is no longer obvious, though a residue of fibre may be present in it.

In carrying out my invention with, for example, anthracite fines or culm, the fuel-material is preferably washed to reduce the ash-content, and is ground to produce a fairly uniform comminution. The washed and ground fuel material fines are then intimately mixed with a suspension of the colloidal cellulose in water, the resulting pasty or plastic mass formed into briquettes by any of the known mechanical apparatus and methods, preferably by extrusion into rod-form and cutting into briquettes with the usual wire-wheel. I have obtained good results by mixing anthracite fines, 100 parts, water 92 parts, colloidal cellulose in suspension in the water 8 parts.

Briquettes formed of this composition need only to be air dried. The reduction of the water by evaporation progressively concentrates the cellulose until the latter reverses phase and assumes an irreversible condition; its adhesive and binding properties become more and more pronounced and in the final condition are such as to integrate the briquette into a strongly consistent mass, amply resistant to fracture for all ordinary conditions of handling. The cellulose being irreversible is indifferent to water and weather, so that briquettes thus prepared can be stored in the open without liability to disintegration. The colloidal cellulose binder burns without smoke, so that briquettes made with it are not more smoky as fuel than the fuel fines themselves which they comprise. The water-suspension used in mixing the briquette material involves the least expensive liquid vehicle; the behavior of the colloidal cellulose in assuming its irreversible condition along with its maximum adhesive efficiency, obviates the necessity of special chemical or thermal treatments which have been requisite with other weatherproof binding materials for briquette fines.

I claim:

1. That method of briquetting coal fines which is characterized by making a plastic mass of coal fines with cellulose hydrate dispersed in an excess of water, forming briquettes of said mass, and evaporating the water to a content productive of irreversibility in the cellulose.

2. That method of briquetting fuel fines which is characterized by making a plastic mass of fuel fines with cellulose hydrate dispersed in an excess of water, forming briquettes of said mass, and evaporating the water to a content productive of irreversibility in the cellulose.

3. That method of briquetting coal fines which is characterized by making a plastic mass of coal fines with a colloidal cellulose dispersed in an excess of water, forming briquettes of said mass and evaporating the water to a content productive of irreversibility in the cellulose.

4. That method of briquetting fuel fines which is characterized by making a plastic mass of fuel fines with a colloidal cellulose dispersed in an excess of water, forming briquettes of said mass and evaporating the water to a content productive of irreversibility in the cellulose.

5. That method of briquetting coal fines which is characterized by making a plastic mass of coal fines with a colloid inherently capable of assuming an irreversible condition on elimination of water dispersion, dispersed in an excess of water, forming briquettes of said mass and evaporating the water to a content productive of irreversibility in said colloid.

6. That method of briquetting fuel fines which is characterized by making a plastic mass of fuel fines with a colloid inherently capable of assuming an irreversible condition on elimination of water dispersion, dispersed in an excess of water, forming briquettes of said mass and evaporating the water to a content productive of irreversibility in said colloid.

7. Briquette, comprising coal fines adhesively bound by intermixture of cellulose hydrate in substantially dry condition and non-dispersible in water.

8. Briquette, comprising fuel fines adhesively bound by intermixture of cellulose hydrate in substantially dry condition and non-dispersible in water.

9. Briquette, comprising coal fines adhesively bound by intermixture of a colloidal cellulose in substantially dry condition and non-dispersible in water.

10. Briquette, comprising fuel fines adhesively bound by intermixture of a colloidal cellulose in substantially dry condition and non-dispersible in water.

Signed by me at Cambridge, Massachusetts this 12th day of June 1928.

ARTHUR D. LITTLE.